2,983,611

GELATIN COMPOSITIONS CONTAINING HARDENERS

Charles F. H. Allen and Donald M. Burness, Rochester, N.Y., assignors to Eastman Kodak Company, Rochester, N.Y., a corporation of New Jersey No Drawing. Filed Sept. 16, 1957, Ser. No. 683,977

7 Claims. (Cl. 96—111)

This invention relates to the hardening of gelatin to enhance its resistance to water by incorporating in the gelatin aziridinyl azine compounds.

In the use of gelatin, particularly for photographic purposes, the gelatin is often treated with a succession of aqueous baths which may vary in pH or which may have elevated temperatures. There has been considerable investigation of means for treating gelatin to so improve its resistance to water that melting or excessive swelling of the gelatin does not occur in aqueous processing operations or in drying by means of hot air or radiant heat. A number of classes of compounds heretofore have been found useful for treating gelatin to reduce the swelling or melting thereof under processing conditions. These include for example: (1) metallic salts such as those of chromium, aluminum, and zirconium; (2) aldehydes such as formaldehyde or mucochloric acid; (3) 1,2- or 1,4-diketones; (4) quinones which possibly might be considered as diketones.

Hardeners of the type listed in many instances have exhibited unwanted effects of one kind or another when employed in photographic products. For instance, hardeners of the aldehyde type sometimes show a tendency to cause an increase in fogging of the emulsion when employed as a hardener therein. Other types of hardeners have a tendency to cause loss of speed of the emulsion upon storage thereof. It is desirable that the hardeners for gelatin which are used for photographic purposes such as in photographic emulsions or in layers adjacent thereto do not adversely affect the photosensitive characteristics of the emulsion.

One object of my invention is to provide hardeners for gelatin which exhibit no known detrimental photographic effects. Another object of my invention is to provide materials which when mixed with gelatin will render the same resistant to the effects of water of varying pH or of various elevated temperatures. A further object of my invention is to provide for the hardening of gelatin by the use of aziridinyl azine type compounds. Other objects of my invention will appear herein.

I have found that gelatin is rendered resistant to the effects of water even at elevated temperatures by incorporating therein compounds having aziridinyl azine structures of the bis and tris type. One type of aziridine azine compound which has been found to be useful is that obtained by the reaction of cyanuric chloride with ethylenimine under appropriate conditions. The principal product thus obtained is triethylenemelamine, the preparation of that compound taking place in accordance with the following formula:

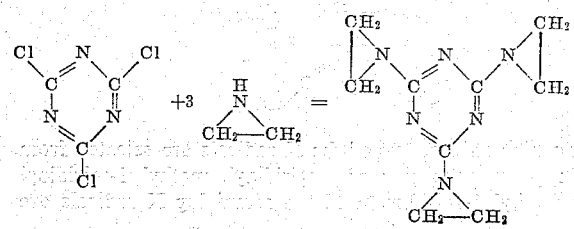

If in the above reaction only 2 moles of the base are reacted with the cyanuric chloride there is obtained the disubstituted compound. This product is also an effective gelatin hardener as are the analogs thereof in which the 3rd chlorine of the cyanuric chloride is replaced by methoxyl, amino, substituted amino, alkylmercapto, or the like. Closely related compounds which are also effective are those which are derived from pyrimidine which compounds have formulas of the following types:

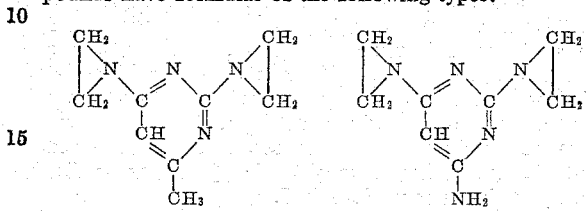

Those derivatives which have both or all 3 of the aziridine rings in the 2-, 4-, and 6-positions have been found to be especially useful in the hardening of gelatin in accordance with our invention. In some compounds which are useful for this purpose it has been found desirable to have lower alkyl such as methyl or ethyl substituted in the aziridine rings which are employed.

My invention is conveniently carried out by mixing gelatin in the form of its aqueous solution with 1 or more hardeners corresponding to the above formulas. There are no critical limitations on the proportion of the aziridine azine compound which may be added to the gelatin compositions. However, as a rule an amount of those compounds of at least 0.5% based on the weight of the gelatin, gives a decided hardening in gelatin when coated out as a coating either as a skin or upon a supporting surface. For economic reasons it is ordinarily desirable to use no more than 5% of the hardening compound in the gelatin compositions based on the weight of the gelatin.

The following examples illustrate the preparation of compounds which are useful for hardening gelatin in accordance with our invention.

Example 1

To a cold solution having a temperature of less than 10° C. of 26 grams of ethylenimine and 60.6 grams of triethylamine in 500 ml. of benzene was added dropwise a filtered solution of 36.8 grams of cyanuric chloride in 400 ml. of benzene. The mass was kept at a temperature of below 10° C. for 1 hour. The mixture was then filtered and the filtrate was concentrated at 150 ml. to obtain crystallization. There was obtained 20 grams of colorless crystals. Recrystallization from ethyl acetate yielded needles of triethylenemelamine which it was found would decompose without melting at 150° C.

Example 2

A solution of 46 grams of cyanuric chloride in 100 ml. of dioxane was prepared. This solution was added with stirring to 500 ml. of ice water. With the temperature at 0° C. there was added a solution of 22 grams of ethylenimine and 69 grams of potassium carbonate in 500 ml. of water. The mass was kept at 0° C. for 15 minutes and the mixture was then filtered, washed, and dried in a vacuum desiccator at 50–60° C. 2,4-bis(1-aziridinyl)-6-chloro-s-triazine was obtained in the form of a crude product. This material was extracted with 500 ml. of $CHCl_3$—$CCl_4$ (2:3). The crystals thus obtained were recrystallized from benzene and then from methanol to give 16 grams of product having a melting point of 144° C.

Example 3

A suspension was prepared of 5 grams of the product obtained in the preceding example in 50 ml. of methanol. There was added thereto a solution of 0.57 gram of sodium in 25 ml. of methanol. After 2 hours at 30° C. the solution was filtered and concentrated to 15 ml. to obtain 3.8 grams of 2,4-bis(1-aziridinyl)-6-methoxy-s-triazine in the form of a crude product. The material was recrystallized from 100 milliliters of methylcyclohexane to give 2.9 parts of large colorless crystals having a melting point of 175–119° C.

*Example 4*

A mixture was prepared of 13.5 grams of cyanuric chloride and 25.6 grams of sodium carbonate in 200 ml. of cold water. There was added thereto a solution of 13 grams of 2-methyl aziridine in 35 ml. of water keeping the temperature below 8° C. The mass was stirred at 25° C. for 1 hour and was then filtered. The filtrate thus obtained was extracted with chloroform. The extract was evaporated to dryness and the product was recrystallized from 100 ml. of ligroin to give 19.4 grams of needles melting within the range 95–97° C.

In using these hardeners in aqueous gelatin compositions it is ordinarily desirable that they first be dissolved in water or in inert solvent and added to the gelatin composition in the form of their solution. If a photographic emulsion is being hardened the solvent used for incorporating the hardener should be one with no detrimental effect thereon.

The following examples illustrate the use of compounds of this type in gelatin coating compositions.

*Example 5*

To a negative type bromo iodide silver emulsion in which gelatin was employed as the carrier, which emulsion was chemically sensitized with sulfur and gold and with a cyanine dye, was added 2,4,6-tris(2-methyl-1-aziridinyl)-s-triazine in the amount of 2.8 grams per 100 parts of gelatin and still another sample of the emulsion was coated without any addition of hardening agent. It was found that the melting point of coatings prepared from the photographic emulsion containing the hardener in accordance with our invention showed a melting point of 212° F., that in the case of the emulsion with hardening agent the melting point of the layer prepared therefrom was 87° F., and that the other photographic properties were good, both as determined in fresh tests and after standing for a week at 120° F. It appeared that these coatings were also superior to those in which formaldehyde had been incorporated.

*Example 6*

A silver halide-gelatin photographic emulsion was mixed with 2,4-bis(1-aziridinyl)-6-chloro-s-triazine in the proportion of 1.13 parts of the hardener per 100 parts of gelatin. To another sample was added .45% of formaldehyde. Coatings of the gelatin emulsions showed that those with the aziridinyl azine hardening agent exhibit considerably more resistance to the effect of hot water than do untreated coatings. The aziridine azine hardener employed does not adversely affect the photographic properties of a photosensitive emulsion either in the fresh coating or after it has been allowed to stand at 120° F. for a week.

*Example 7*

Triethylenemelamine was added to a fast negative type gelatin-silver halide emulsion in varying proportions. One composition was prepared in which .57 part triethylenemelamine was employed as the hardener, another in which 2.28 parts thereof and another in which 0.46 part of formaldehyde was employed, all proportions being based on the weight of 100 parts of gelatin. It was found that the emulsions prepared retained their effective photosensitivity both when coated out in the form of fresh tests and after incubation at 120° F. for a week.

The efficacy of the hardener in accordance with our invention when incorporated in gelatin was tested by placing the coating in water and gradually increasing the temperature of that water and recording the point at which the coating disintegrated or melted. In every case using a hardener in accordance with our invention in a substantial proportion in a gelatin composition the gelatin coating withstood melting in water up to a temperature of 212° F., whereas without a hardener the gelatin coating melted upon but small increase in temperature of the water above normal. Also, the emulsions containing hardeners exhibit less fog or at least no more fog than similar emulsions which had not been subjected to hardening.

It has been found that on keeping the hardened emulsions of this invention, especially at high temperatures, the aziridinyl triazines increase the tendency for the emulsion to lose sensitivity. Hardened emulsions generally lose contrast and sensitivity on storage when the same development conditions are used for the fresh coatings and for coatings processed after storage, because continued hardening decreases the development rate; however, this loss in the presence of the aziridinyl triazines is greater than can be explained by the slower development rate. As stated above, it is not accompanied by an increase in fog. It has been found that this speed loss can be prevented and the emulsions stabilized by incorporating in the emulsion along with the hardening agent, a stabilizing agent such as 4-hydroxy-6-methyl-1,3,3a,7-tetrasaindene and related compounds, 7-hydroxy-1,2,3,4, 6-pentazaindene, urazole or parabanic acid. These stabilizing agents are also effective when other aziridine hardeners are used such as N,N'-hexamethylene bis-(1-aziridine carboxamide).

The emulsion in which hardeners are incorporated in accordance with our invention may be coated out onto any type of support such as cellulose ester film base, paper, fabric, glass or the like to form photographic products. The emulsions in accordance with our invention will cling to the support even when the temperature of the product in the water has reached a point where ordinarily the emulsion melts and separates from the support therefor.

The hardeners which we have described are useful in various kinds of gelatin photographic emulsions. In addition to being useful in known optically sensitized emulsions they are also useful in orthochromatic, panchromatic, or X-ray type emulsions. They may be added to the emulsion either before or after the addition of sensitizing dyes or other sensitizers. The hardeners in accordance with our invention are useful both in products employed in black-and-white photography and in those which are adapted for color photography.

We claim:

1. A composition of matter comprising an aqueous solution of gelatin containing therein a small proportion of an aziridinyl azine selected from the class consisting of those of the following formulas:

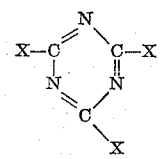

and

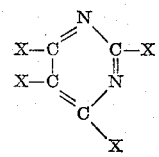

in which at least two of the X radicals are selected from the group consisting of 1-aziridinyl, methyl 1-aziridinyl and ethyl 1-aziridinyl and the remaining X radicals are selected from the group consisting of hydrogen, alkyl, amino, alkoxyl, halogen and nitro.

2. A silver halide-gelatin photographic emulsion containing therein a small proportion of an aziridinyl azine selected from the class consisting of those of the following formulas:

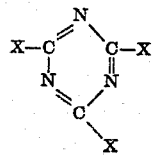

and

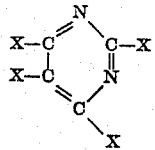

in which at least two of the X radicals are selected from the group consisting of 1-aziridinyl, methyl 1-aziridinyl and ethyl 1-aziridinyl and the remaining X radicals are selected from the group consisting of hydrogen, alkyl, amino, alkoxyl, halogen and nitro.

3. Gelatin containing therein 0.5–5% of an aziridinyl azine selected from the class consisting of those of the following formulas:

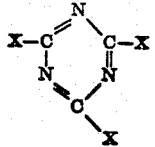

and

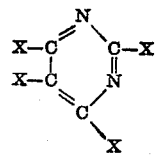

in which at least two of the X radicals are selected from the group consisting of 1-aziridinyl, methyl 1-aziridinyl and ethyl 1-aziridinyl and the remaining X radicals are selected from the group consisting of hydrogen, alkyl, amino, alkoxyl, halogen and nitro.

4. A composition of matter comprising an aqueous solution of gelatin having therein a small proportion of 2,4,6-tris(2-methyl-1-aziridinyl)-s-triazine.

5. A composition of matter comprising an aqueous solution of gelatin having therein a small proportion of 2,4-bis(1-aziridinyl)-6-chloro-s-triazine.

6. A silver halide-gelatin photographic emulsion containing therein a small proportion of 2,4,6-tris(2-methyl-1-aziridinyl)-s-triazine.

7. A silver halide-gelatin photographic emulsion containing therein a small proportion of 2,4-bis(1-aziridinyl)-6-chloro-s-triazine.

References Cited in the file of this patent

UNITED STATES PATENTS

| | | |
|---|---|---|
| 2,476,536 | Dersch | July 19, 1949 |
| 2,487,569 | Mackey | Nov. 8, 1949 |
| 2,653,934 | Kaiser | Sept. 28, 1953 |